US011115234B2

(12) United States Patent
Hoche et al.

(10) Patent No.: US 11,115,234 B2
(45) Date of Patent: Sep. 7, 2021

(54) ASSEMBLY AND METHOD FOR AN AIRPLANE FOR TRANSMITTING AN ANALOG AUDIO SIGNAL

(71) Applicant: DIEHL AEROSPACE GMBH, Ueberlingen (DE)

(72) Inventors: Peter Hoche, Schmitten (DE); Uwe Salomon, Offenbach (DE)

(73) Assignee: DIEHL AEROSPACE GMBH, Ueberlingen (DE)

(*) Notice: Subject to any disclaimer, the term of this patent is extended or adjusted under 35 U.S.C. 154(b) by 65 days.

(21) Appl. No.: 16/500,234

(22) PCT Filed: Mar. 6, 2018

(86) PCT No.: PCT/EP2018/000088
§ 371 (c)(1),
(2) Date: Oct. 2, 2019

(87) PCT Pub. No.: WO2018/184714
PCT Pub. Date: Oct. 11, 2018

(65) Prior Publication Data
US 2020/0059380 A1    Feb. 20, 2020

(30) Foreign Application Priority Data

Apr. 8, 2017   (DE) .................. 102017003434.6

(51) Int. Cl.
*H04L 12/40* (2006.01)
*B64D 11/00* (2006.01)
*H04L 12/403* (2006.01)

(52) U.S. Cl.
CPC .. *H04L 12/40039* (2013.01); *B64D 11/00155* (2014.12); *H04L 12/403* (2013.01); *H04L 2012/40215* (2013.01)

(58) Field of Classification Search
CPC .... H04L 12/40039; H04L 2012/40215; B64D 11/00155
See application file for complete search history.

(56) References Cited

U.S. PATENT DOCUMENTS 10,841,720 B1 *   11/2020   Tarter ................. H04R 3/00
2006/0187022 A1 *   8/2006   Dawson ............... H04B 3/542
340/538.11

(Continued)

FOREIGN PATENT DOCUMENTS

| DE | 102006044901 A1 | 4/2008 |
|----|-----------------|--------|
| EP | 2811695 A1      | 12/2014 |
| GB | 1596195 A       | 8/1981 |

OTHER PUBLICATIONS

International Search Report dated May 17, 2018 issued in PCT/EP2018/000088.

*Primary Examiner* — Glenn A. Auve
(74) *Attorney, Agent, or Firm* — Scully, Scott, Murphy & Presser, P.C.

(57) ABSTRACT

In an assembly (2) for an airplane (4) with a line (12) and switching elements (14a,b) to connect the line (12) in a first operating mode (B1) to digital transceivers (16a,b) and in a second operating mode (B2) to an analog signal source/sink (18a,b) for the audio signal (A), the line (12) is operated in the first operating mode (B1) as a digital data bus for data (D) and in the second operating mode (B2) as an analog signal line for transmitting an analog audio signal (A) from the signal source (18a) to the signal sink (18b).
In a corresponding method, the line (12) is operated in a first operating mode (B1) as a digital data bus for transmitting data (D) and the line (12) is switched to the second operating mode (B2) for transmitting the audio signal (A), and the audio signal (A) is transmitted from the signal source (18a) via the line (12) to the signal sink (18b).

15 Claims, 1 Drawing Sheet

(56) References Cited

U.S. PATENT DOCUMENTS

2007/0189549 A1* 8/2007 Scheel .................. H04R 27/00
 381/86
2013/0314257 A1* 11/2013 Macrae ................. B64D 43/00
 340/971
2015/0055785 A1 2/2015 Donaldson

* cited by examiner

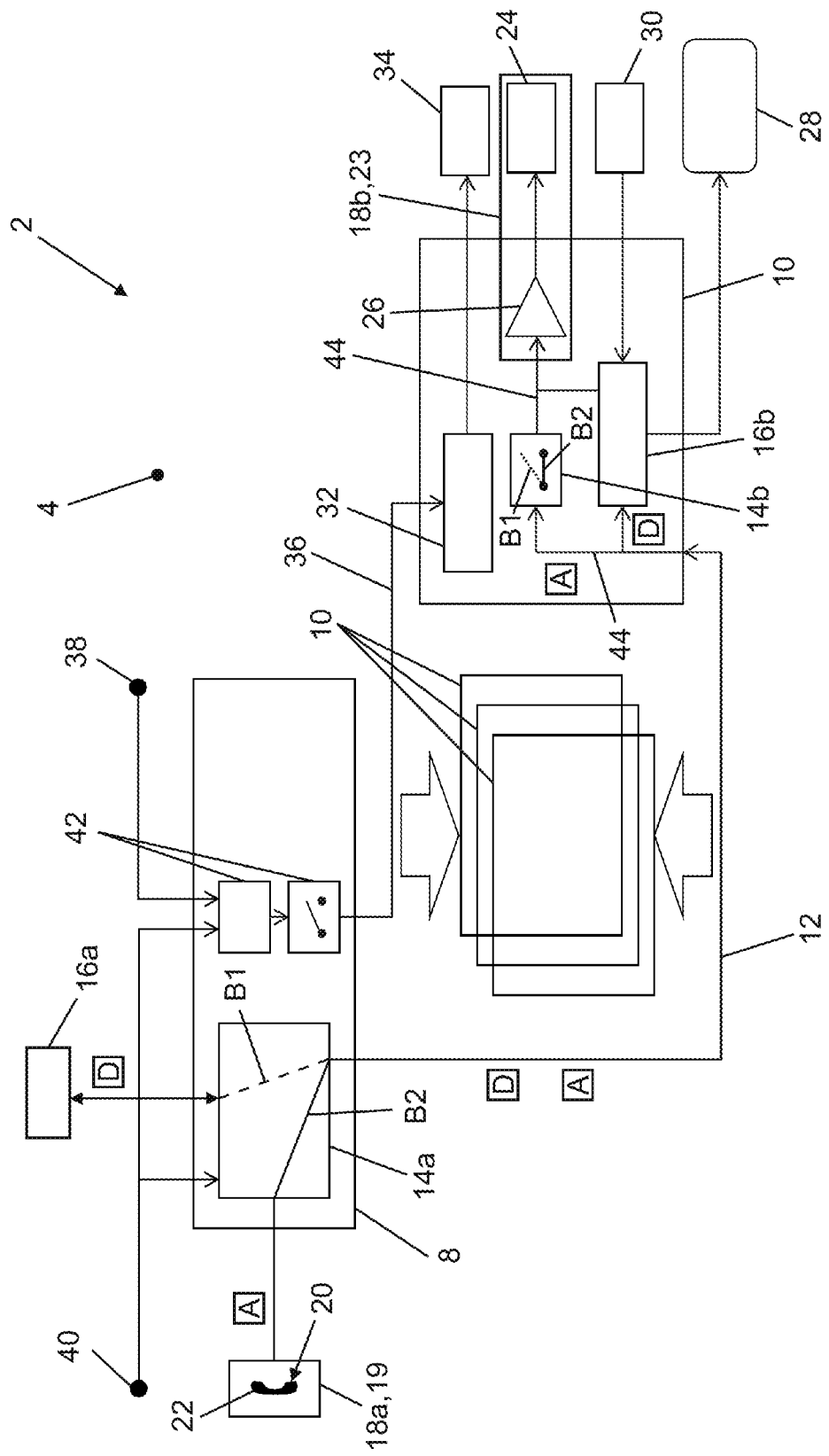

ASSEMBLY AND METHOD FOR AN AIRPLANE FOR TRANSMITTING AN ANALOG AUDIO SIGNAL

The invention relates to an assembly and a method for an airplane for transmitting an analog audio signal from a signal source to a signal sink.

In airplanes, an, in particular, simple, secure and energy-saving transmission of an audio signal from a signal source to a signal sink is desired in specific cases. A requirement here, inter alia, is that airplane personnel can make announcements to flight passengers by means of microphones, loudspeakers and the associated cabling. Such a case is, for example, an emergency and the provision of a public address system according to 14 CFR 25.1423. It is known from practice that airplanes have an analog-operating microphone/loudspeaker system with corresponding cabling for the above-mentioned announcements.

The object of the invention is to improve the transmission of the above-mentioned analog audio signal.

The object is achieved by an assembly as claimed in patent claim 1 for an airplane for transmitting an analog audio signal from a signal source of the assembly to a signal sink of the assembly. Preferred or advantageous embodiments of the invention and other inventive categories can be found in the further claims, the following description and the attached FIGURES.

The assembly contains a line designed with at least two wires for the airplane. The assembly contains a first switching element. The first switching element is designed for this purpose or, in a first operating mode of the assembly, connects the line (in particular its first end) to a first digital transceiver of the airplane. In a second operating mode, it connects the line (where appropriate its first end) to the analog signal source for the audio signal.

The assembly contains a second switching element. This element is designed for this purpose or, in the first operating mode, connects the line (in particular its second end) to a second digital transceiver of the airplane. In the second operating mode, it connects the line (where appropriate its second end) to the analog signal sink for the audio signal.

In the first operating mode, the line is operated as a digital data bus for transmitting data between the two digital transceivers. In the second operating mode, the line is operated as an analog signal line for transmitting the analog audio signal from the signal source to the signal sink.

According to the invention, the assembly is therefore operated in two operating modes. In the first operating mode, the two digital transceivers are connected via the line in the form of a digital data bus for the digital exchange. Audio data are transmitted, for example, in high quality, e.g. in CD quality, purely digitally from the first digital transceiver to the second digital transceiver. In the second operating mode, the same line forms an analog signal line for the purely analog connection of the signal source to the signal sink in order to transmit the analog audio signal via the signal line from the signal source to the signal sink.

In particular, the signal source and/or the first transceiver form part of an input unit and/or the signal sink and/or the second transceiver form part of an output unit. However, the corresponding elements can also be located outside the input unit or output unit and can only be or become linked or connected to the line in said unit.

According to the invention, a single line or the same line can be used both in the first operating mode digitally for any purposes and in the second operating mode for transmitting the audio signal. The line in the form of the digital data bus performs a dual function. An additional cabling for the analog transmission of the audio signal is thus no longer required, resulting in a saving in terms of cost and weight in the airplane.

According to the invention, a digital function, in particular an audio function in CD quality, is therefore implemented in an aircraft cabin with simultaneous consideration of the requirements according to 14 CFR 25.1423 for a passenger address system in an emergency (first/second operating mode). The assembly or line for a digital audio transmission in CD quality therefore also has the (time-delayed) facility of an analog backup for the passenger address function in an emergency. The invention therefore combines both transmission variants (digital, analog) using the same line hardware or bus hardware.

In one preferred embodiment of the invention, the line is a CAN bus line. According to this embodiment, a digital transmission, in particular an audio transmission via a CAN bus, is therefore performed in the first operating mode. This bus is therefore used normally or as intended. In the second operating mode, an analog audio transmission is performed via the line of the CAN bus. The CAN bus is therefore used for non-designated purposes in the second operating mode as an analog signal line. CAN bus lines are already widely used in airplanes, as a result of which the assembly becomes simple and economical.

In one preferred embodiment, the first operating mode is a standard normal operation of the assembly and the second operating mode is an emergency operation of the assembly. The assembly, or at least its resource in the form of the line, can therefore be used in normal operation for any digital data transmission in the airplane. In an emergency, the assembly or at least the line then performs the above-mentioned emergency functionality as a dual function. Resources and therefore costs and outlay in the airplane are therefore saved.

In one preferred embodiment, the signal sink is an analog loudspeaker unit. Alternatively or additionally, the signal source is an analog microphone unit. Here, the loudspeaker unit and microphone unit can contain only a loudspeaker and microphone, but also upstream or downstream amplifiers, signal processing, filters, etc. As explained correspondingly above, one or more components of the loudspeaker unit and microphone unit can again be disposed inside or outside the input unit or output unit. In this case, the audio signal can be particularly simply input via a microphone and output via a loudspeaker.

In one preferred embodiment, the airplane contains an output unit in the form of a passenger service unit (PSU) or forms part thereof. Alternatively or additionally, it contains an input unit in the form of a central unit which is designed to supply the output unit with data in the first operating mode or forms part thereof. The assembly is then intended for an airplane of this type. In particular, the PSU and/or the central unit form part of the assembly. In particular, the central unit supplies all PSUs of the airplane or all PSUs can be activated, controlled, supplied, read, operated, etc. centrally herefrom. Here, each of the PSUs is assigned to or is responsible for at least one seat for a passenger. A corresponding PSU is a standard and known product and, in a known manner, contains, for example, an audio output in the form of a loudspeaker or a headset socket, a video display, a call button to call airplane personnel to the seat, signal lights such as fasten-seatbelts signs, no smoking indicators, etc. These then represent the second transceivers or are connected via them to the line. The central unit provides here, for example in the first operating mode, audio data in CD quality, video data, data for service displays to the PSUs and is designed, e.g. to receive and further process or signal call signs of the PSUs. These tasks are also performed by corresponding first transceivers, or corresponding devices or components are connected to the line via the first transceivers. According to the invention, the output unit and input unit therefore also perform the feed-in or input and output or forwarding of the analog audio signal in a dual functionality in the second operating mode. Further hardware components in the airplane are saved due to the corresponding dual functionality.

In one preferred embodiment, the first operating mode is the operating mode to which the assembly is set following an activation procedure. Alternatively or additionally, all components of the assembly which are not required for transmitting the audio signal, in particular the digital transceivers, are switched off in the second operating mode. Switched off means that they have no or only a negligible power consumption. In particular, all digital comfort functionalities of the assembly are switched off or deactivated or de-energized, for example displays, reading lights, digital audio and video processors in the PSUs or corresponding components for the digital signal processing, signal input and signal output in the central unit.

Thanks to this embodiment, the assembly is always set initially in operation to the first operating mode, i.e. it is ready for digital transmission. It is thus possible to transmit a digital command via the line to the output units or second transceivers with corresponding switch-off and deactivation commands in the first operating mode before switchover to the second operating mode in order to deactivate all components which are not required for the second operating mode. Switchover to the second operating mode is then possible. However, since no digital communication facility, in particular reception facility (a number of switched off components) exists in the output unit, a reversion to normal operation (first operating mode) of the switched off components would not be simply possible once more. This is then solved by an in particular brief complete switch-off of the assembly or input units and/or output units. When the operating voltage returns or is switched on, said units then revert to the first operating mode and attain full functionality once more.

An energy saving is achieved by switching off unwanted components in the second operating mode, this being advantageous, particularly in an emergency operation in order to have as much emergency power as possible available.

In one preferred embodiment, the assembly is supplied with power in the first operating mode at least from a normal airplane on-board power supply system and, in the second operating mode, at least from an emergency power supply system. "Normal" means the usual fault-free operation of the airplane in which sufficient energy is available. It is thus ensured that, in the first, usually normal, operating mode, an adequate power supply of the assembly is guaranteed via the normal airplane on-board power supply system in order to implement diverse functions, including comfort functions. In the second operating mode, it is ensured by the emergency power supply system that the assembly can in any event remain in operation as long as possible at least for the analog audio transmission, as long as the emergency power supply system is still active. The airplane on-board power supply system is, for example, the conventional 28-volt on-board power supply system. The emergency power supply system is a 28-volt essential bus.

In one preferred variant of this embodiment, the signal source is, as explained above, supplied from the normal airplane on-board power supply system and/or the emergency power supply system. The line and/or the signal sink is/are supplied in turn from a signal source and/or an input unit, as described here, e.g. a central unit, i.e. supplied only indirectly via the signal source from these supply systems, therefore having no dedicated interface to the supply systems. The line is therefore also supplied with power from the signal source. This saves cabling outlay in the airplane.

In one preferred embodiment, the first and/or the second switching element is an electronic switching element. The connection or switchover of the line to the respective analog or digital elements is therefore performed, for example, within the chip or electronically, for example by means of a transistor circuit or similar, and not by a discrete mechanical switching element. The switchover is thus low-wear.

In one alternative embodiment, the first and/or second switching element contain(s) a discrete switching element. The switching element is used for the electrical connection of the line to the signal source and/or to the signal sink in the second operating mode by means of an analog line path. Conversely, in the first operating mode, an electrical isolation of the line path is performed. This analog signal path can thus be set up particularly simply and reliably.

The object of the invention is also achieved by a method as claimed in patent claim 11 for an airplane for transmitting an analog audio signal from a signal source to a signal sink of the airplane. The method is based on an airplane which also contains a line designed with at least two wires. The line is connectable in a second operating mode to the analog signal source for the audio signal and to the analog signal sink for the audio signal. In the method, the line is operated in a first operating mode as a digital data bus for transmitting data. In a second operating mode, the line is operated as an analog signal line. The line is switched to the second operating mode for transmitting the audio signal and the audio signal is transmitted from the signal source via the line to the signal sink.

The method and at least some of its embodiments and the respective advantages have already been explained accordingly in connection with the assembly according to the invention.

In one preferred embodiment, the line is connected in the first operating mode to a first digital transceiver and to a second digital transceiver.

In one preferred embodiment, the line is supplied with power in the first operating mode at least from a normal airplane on-board power supply system and, in the second operating mode, at least the line and the signal source and signal sink are supplied with power from an emergency power supply system if they in each case require any energy at all.

In one preferred embodiment, the line is electrically connected by means of a discrete switch as the first and/or second switching element or a corresponding part thereof in the second operating mode to the signal source and/or to the signal sink by means of an analog line path. In the first operating mode, the line path is electrically isolated by means of the discrete switch.

In one preferred embodiment, the method is carried out by means of the assembly according to the invention.

The invention is based on the following realizations, observations and considerations and also has the following embodiments. The embodiments are also referred to in some cases as "the invention" for simplification purposes. Here, the embodiments can also contain parts or combinations of the above-mentioned embodiments or can correspond to them and/or can possibly include hitherto unmentioned embodiments.

Modern airplanes in any event normally have a digital cabling, in particular a high-quality audio system in which audio data (music, video sound) are transmitted in high quality to the seats of passengers. This involves all-digital systems which implement the data transmission, for example, via a CAN bus. In the known systems, a digital transmission is therefore performed via the CAN bus with various codecs. All-analog variants are also known.

A corresponding CAN bus is normally designed with three wires, two data lines and one ground line and can therefore also be used for non-designated purposes as an analog signal line.

According to the invention, a considerable saving is achieved in terms of outlay for cables to be installed in the airplane. According to the invention, in particular a 28-volt DC voltage supply of the PSU is provided from an input unit in the form of a central computer to control the PSUs. During normal operation, the central unit and therefore the PSUs are supplied via the normal 28-volt DC current on-board power supply system. All systems of the PSU, for example processors, etc., are active. Digital audio CD quality is available in the PSU. Outputs are provided, for example, on a display or via LEDs. In an emergency or passenger address case according to CS 25.1423, the central unit and therefore the PSUs are supplied from the emergency supply ("essential bus"). All processing in the PSU is switched off. An analog audio transmission is available.

In normal operation, the PSUs are therefore supplied from a central computer and with a 28-volt DC voltage from the normal power supply system of the airplane. Audio data are transmitted in CD quality in parallel to all PSUs via a bus. The CAN bus functions as the hardware and protocol level. An audio codec is used. A decoding and amplification of the audio data take place in the processing unit of the PSUs. Each PSU can simultaneously receive other commands, switching states, etc., and can transmit its own commands to the central unit (passenger request, etc.).

In emergency operation or passenger address operation according to CS 25.1423, the central computer supplies the PSU from the 28-volt DC current (essential) bus. All PSUs are instructed by a command via the CAN bus to switch off their processing unit and all further possibly present components, displays, lights, etc. No further digital data are transmitted thereafter via this bus. Only the output amplifier of each PSU, the input of which is simultaneously connected to the CAN bus, remains active, from now on analog. The necessary power consumption thereby decreases significantly, for example by 1 kilowatt.

The audio data are then injected in analog form onto the physical level of the CAN bus and are in each case switched accordingly in the PSUs onto the output amplifier. This mode is ended by a switch-off and switch-on procedure of the PSUs, controlled by the central computer. Following power-up, the PSUs operate once more in normal mode. Following the switch-on procedure, the normal 28-volt DC voltage supply is again applied.

Alternatively, a part of the transmission path, in particular the connection from the signal source to the line, can also be designed as a digital connection for the analog audio signal. A D/A converter is then present between the input unit and the line to generate or reconstruct the analog audio signal for the transmission via the line.

In normal operation, in particular, the PSU is therefore supplied via 28V DC, digital processing is active in the PSU, digital audio in CD quality is available and outputs are available on displays or LEDs. In passenger address operation (CS 25.1423), the PSU is supplied from the essential bus (emergency supply), the digital processing is switched off in the PSU and analog audio is available.

In normal operation, the PSUs (Passenger Service Units) are supplied from a central computer with 28V DC from the normal power supply system of the airplane, audio data in CD quality are transmitted in parallel to all PSUs via a bus, the CAN bus is used as the hardware and protocol level. An audio codec is used. A decoding and amplification of the audio data are performed in the processing unit of the PSUs. Each PSU can simultaneously receive other commands (switching states, etc.) and can transmit its own commands to the central unit (passenger request, etc.).

In emergency operation according to Passenger Address (CS 25.1423), the central computer supplies the PSUs from the 28V DC essential bus. All PSUs are commanded via the CAN bus to switch off their processing unit and all further possibly present components (display, lights, etc.). No further digital data are transmitted thereafter via this bus, and only the output amplifier of each PSU, the input of which is simultaneously connected to the CAN bus, remains active. The necessary power consumption thereby decreases significantly. Audio data are now injected in analog form onto the physical level of the CAN bus and are switched accordingly in each case in the PSUs onto the output amplifier. This mode is ended by a switch-off and switch-on procedure of the PSUs, controlled by the central computer. Following power-up, the PSUs operate once more in normal mode.

According to the invention, a digital or analog audio transmission takes place via a CAN bus. CD quality is provided through digital transmission in normal operation, but furthermore or additionally a complete implementation of the CS 25.1423 requirements.

Further features, effects and advantages of the invention can be found in the following description of the preferred example embodiment of the invention and the attached FIGURE, wherein, in a schematic diagram:

FIG. 1 shows an airplane with an assembly according to the invention.

FIG. 1 shows symbolically an assembly 2 which is installed in a merely outlined airplane 4. The assembly serves to transmit an analog audio signal A from a signal source 18*a* to a signal sink 18*b*. The assembly contains an input unit 8 and an output unit 10 which are connected via a line 12. In the example, the line 12 is a CAN bus and is designed with three wires. The assembly 2 contains a first switching element 14*a*. In a first operating mode B1 (indicated by a dotted line), this element connects a line 12 (its first end) in the input unit 8 to a first digital transceiver 16*a*. Conversely, in a second operating mode B2 (represented by a solid line), it connects the line 12 to the signal source 18*a* for the audio signal A. The assembly 2 contains a second switching element 14*b*. In the first operating mode B1, this element connects the line 12 (its second end) to a second digital transceiver 16*b*. In the second operating mode B2, it connects the line 12 to the analog signal source 18*b* for the audio signal A. The line 12 is operated in the first operating mode B1 as a digital data bus and in the second operating mode B2 as an analog signal line. In the example, the signal source 18*a* is a microphone unit 19 with a microphone 20 in a handset 22, and the signal source 18*b* is a loudspeaker unit 23 with a loudspeaker 24 and an analog audio amplifier 26. The line 12 is a CAN bus line.

The first operating mode B1 is a standard normal operating mode of the assembly 2, and the operating B2 is an emergency operation (Passenger Address (CS 25.1423)).

The airplane 4 contains a multiplicity of PSUs which are shown only symbolically in FIG. 1. The output units 10 are the PSUs. Only one of the PSUs is shown in detail by way of example.

The input unit 8 is a central unit which is designed to supply the output units 10 with digital data D in the first operating mode B1. In this case, data D are digital audio data (not shown in detail) for output on the loudspeaker 24 via the second transceiver 16*b*, here a processor, output data for symbols on display units 28, here, by way of example, a fasten-seatbelts sign, and notification data to be received from the PSU to the central unit e.g. by pressing a service button 30. The PSU also has a power logic 32 which supplies, inter alia, a switchable reading light 34 which is similarly connectable via digitally transmitted data D on the line 12 in the first operating mode B1 by means of the power logic 32.

The output unit 10 is supplied with power via a power connection 36 from the input unit 8, here with 28-volt DC current. The input unit 8 is supplied here with power from either a normal airplane on-board power supply system 38 (here 28-volt DC) or an emergency power supply system 40 (28-volt essential bus). The switchover between the two power supplies is effected by switching elements 42 (not explained in detail).

Following a switch-on procedure, i.e. following application of the voltage from the airplane on-board power supply system 38 or the emergency power supply system 40, the assembly 2 switches or is set to the first operating mode B1.

In the second operating mode B2, all components of the assembly which are not required for transmitting the audio signal A are switched off. In the example, these are the reading light 34, the second transceiver 16*b*, the display unit 28 and the service button 30. These components then have no further power consumption. The assembly 2 is supplied in the first operating mode B1 with energy at least from the normal airplane on-board power supply system 38, and in the second operating mode B2 at least from the emergency power supply system 40.

In the example, the first switching element 14*a* is an electronic switching element, here a processor, which electively controls the line 12 in analog or digital mode or in bus mode and for this purpose signals either forwards the audio signal A from the signal source 18*a* onto the line 12 or exchanges data D between the transceiver 16*a* and the line 12.

Conversely, the second switching element 14*b* is a discrete circuit. In the second operating mode B2, the line 12 is electrically connected using the switch to the signal sink 18*b* by means of an analog line path 44. In the first operating mode B1, the line path 44 is electrically isolated by opening the switch, i.e. by using the switch.

The following method is carried out using the arrangement 2.

In the airplane 4, the method serves to transmit the analog audio signal A from the signal source 18*a* to the signal sink 18*b*. The airplane contains the line 12 which (its one end) is connectable or is connected in the second operating mode B2 to the signal source 18*a* and (its other end) to the signal sink 18. The line 12 is operated in the first operating mode B1 as a digital data bus and in the second operating mode as an analog signal line. For transmitting the audio signal A, the line 12 is switched to the second operating mode B2 and the audio signal A is transmitted from the signal source 18*a* via the line 12 to the signal sink 18*b*.

In the first operating mode B1, the line 12 (its one end) is connected to the first digital transceiver 16*a* and (its other end) to the second digital transceiver 16*b*. The line 12 then also represents a "PSU bus".

In the first operating mode, the input unit 8, the output unit 10 (and connected components 23, 28, 30, 34, 16*b*, 32) and the line 12 are supplied with power at least from the normal airplane on-board power supply system 38. In the second operating mode B2, the line 12, the signal source 18*a* and the signal sink 18*b* are supplied with power at least from the emergency power supply system 40. In the second operating mode B2, the line 12 is electrically connected via the line path 44 to the signal sink 18*b* using the discrete switch in the form of the second switching element 14*b* and serves as an analog audio line, wherein this line path 44 is electrically isolated in the first operating mode B1 using the discrete switch.

REFERENCE NUMBER LIST

2 Assembly
4 Airplane
8 Input unit
10 Output unit
12 Line
14*a* First switching element
14*b* Second switching element
16*a* First transceiver
16*b* Second transceiver
18*a* Signal source
18*b* Signal sink
19 Microphone unit
20 Microphone
22 Handset
23 Loudspeaker unit
24 Loudspeaker
26 Analog audio amplifier
28 Display unit
30 Service button
32 Power logic
34 Reading light
36 Power connection
38 Airplane on-board power supply system
40 Emergency power supply system
42 Switching element
44 Analog line path
B1 First operating mode
B2 Second operating mode
D Data
A Audio signal (analog)

The invention claimed is:

1. An assembly for an airplane for transmitting an analog audio signal from an analog signal source to an analog signal sink,
   wherein the assembly contains a line designed with at least two wires,
   with a first switching element to connect the line in a first operating mode to a first digital transceiver and in a second operating mode to the analog signal source for the analog audio signal,
   with a second switching element to connect the line in the first operating mode to a second digital transceiver and in the second operating mode to the analog signal sink for the audio signal,
   wherein the line is operated in the first operating mode as a digital data bus to transmit data between the two digital transceivers and in the second operating mode as an analog signal line to transmit the analog audio signal from the analog signal source to the analog signal sink.

2. The assembly as claimed in claim 1, wherein the line is a CAN bus line.

3. The assembly as claimed in claim 1, wherein the first operating mode is a standard normal operation and the second operating mode is an emergency operation.

4. The assembly as claimed in claim 1, wherein the analog signal sink is a loudspeaker unit and/or the signal source is a microphone unit.

5. The assembly as claimed in claim 1, wherein the airplane contains an output unit in the form of a passenger source unit (PSU) and/or an input unit in the form of a central unit which is designed to supply the PSU with data in the first operating mode.

6. The assembly as claimed in claim 1, wherein the first operating mode is the operating mode to which the assembly is set following a switch-on procedure and/or, in the second operating mode, all components of the assembly which are not required for transmitting the analog audio signal are switched off.

7. The assembly as claimed in claim 1, wherein the assembly is supplied with power in the first operating mode at least from a normal airplane on-board power supply system and in the second operating mode at least from an emergency power supply system.

8. The assembly as claimed in claim 7, wherein in the assembly, the analog signal source is supplied from the normal airplane on-board power supply system and/or the emergency power supply system and the line and/or the analog signal sink is/are supplied from the analog signal source and/or an input unit.

9. The assembly as claimed in claim 1, wherein the first and/or second switching element contain(s) an electronic switching element.

10. The assembly as claimed in claim 1, wherein the first and/or second switching element contain(s) a discrete switch, wherein the line is electrically connected in the second operating mode using the switch to the analog signal source and/or to the analog signal sink by means of an analog line path, and the line path is electrically isolated in the first operating mode using the switch.

11. A method for an airplane for transmitting an analog audio signal from an analog signal source to an analog signal sink,
wherein the airplane contains a line designed with at least two wires, and
the line is connectable in a second operating mode to the analog signal source and the analog signal sink for the analog audio signal, wherein the method comprises:
operating the line in a first operating mode as a digital data bus for transmitting data and operating the line in a second operating mode as an analog signal line,
switching the line to the second operating mode for transmitting the analog audio signal and transmitting the analog audio signal from the analog signal source via the line to the analog signal sink.

12. The method as claimed in claim 11, wherein the line is connected in the first operating mode to a first digital transceiver and to a second digital transceiver.

13. The method as claimed in claim 11, wherein the line is supplied with power in the first operating mode at least from a normal airplane on-board power supply system, and the line, the analog signal source and the analog signal sink are supplied with power in the second operating mode at least from an emergency power supply system.

14. The method as claimed in claim 11, wherein the line is electrically connected to the analog signal source and/or to the analog signal sink in the second operating mode by means of an analog line path using a discrete switch as the first and/or second switching element, and the analog line path is electrically isolated in the first operating mode using the discrete switch.

15. A method for an airplane for transmitting an analog audio signal from an analog signal source to an analog signal sink,
wherein the airplane contains a line designed with at least two wires, and
the line is connectable in a second operating mode to the analog signal source and the analog signal sink for the analog audio signal, wherein the method comprises:
operating the line in a first operating mode as a digital data bus for transmitting data and
operating the line in a second operating mode as an analog signal line,
switching the line to the second operating mode for transmitting the analog audio signal and transmitting the analog audio signal from the analog signal source via the line to the analog signal sink, wherein
the line is connected in the first operating mode to a first digital transceiver and to a second digital transceiver, wherein
the line is supplied with power in the first operating mode at least from a normal airplane on-board power supply system, and the line, the analog signal source and the analog signal sink are supplied with power in the second operating mode at least from an emergency power supply system, and wherein
the line is electrically connected to the analog signal source and/or to the analog signal sink in the second operating mode by means of an analog line path using a discrete switch as the first and/or second switching element, and the analog line path is electrically isolated in the first operating mode using the discrete switch.

* * * * *